(12) United States Patent
Bahe et al.

(10) Patent No.: US 12,622,437 B2
(45) Date of Patent: May 12, 2026

(54) DUAL TEXTURED FOOD

(71) Applicant: General Mills, Inc., Minneapolis, MN (US)

(72) Inventors: Kristi L. Bahe, Coon Rapids, MN (US); Kevin Haas, St. Louis Park, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 17/719,904

(22) Filed: Apr. 13, 2022

(65) Prior Publication Data

US 2022/0232839 A1    Jul. 28, 2022

Related U.S. Application Data

(63) Continuation of application No. 16/561,367, filed on Sep. 5, 2019, now Pat. No. 11,889,839.

(60) Provisional application No. 62/728,333, filed on Sep. 7, 2018.

(51) Int. Cl.
| | |
|---|---|
| *A21D 10/02* | (2006.01) |
| *A21D 6/00* | (2006.01) |
| *A21D 13/80* | (2017.01) |

(52) U.S. Cl.
CPC ............. *A21D 10/02* (2013.01); *A21D 6/001* (2013.01); *A21D 13/80* (2017.01)

(58) Field of Classification Search
None
See application file for complete search history.

(56) References Cited

U.S. PATENT DOCUMENTS

| | | | |
|---|---|---|---|
| 5,855,945 A | 1/1999 | Laughlin et al. | |
| 5,858,440 A | 1/1999 | Laughlin et al. | |
| 6,165,533 A | 12/2000 | Laughlin et al. | |
| 7,666,457 B1 * | 2/2010 | Lang ...................... A23L 29/37 | |
| | | | 426/302 |
| 2006/0115566 A1 * | 6/2006 | Bloechlinger ....... A21D 10/045 | |
| | | | 426/549 |
| 2007/0184166 A1 * | 8/2007 | Price ..................... A21D 10/04 | |
| | | | 426/549 |
| 2009/0285945 A1 * | 11/2009 | Michael .................. A23P 20/25 | |
| | | | 426/95 |
| 2012/0027886 A1 | 2/2012 | Baisier et al. | |
| 2014/0127356 A1 * | 5/2014 | Torres-Sanchez ..... A21D 6/003 | |
| | | | 426/27 |
| 2015/0366224 A1 * | 12/2015 | Conley .................. A21D 6/001 | |
| | | | 426/26 |

FOREIGN PATENT DOCUMENTS

| | | | | |
|---|---|---|---|---|
| CA | 2909353 | * | 11/2014 | |
| CN | 102480973 A | * | 5/2012 | ............. A21D 10/10 |
| RU | 2370038 C2 | * | 10/2009 | ............. A21D 13/02 |
| WO | WO 2014177390 | * | 6/2014 | |
| WO | WO-2014177390 A1 | * | 11/2014 | ............. A21D 2/145 |

* cited by examiner

*Primary Examiner* — Lien T Tran
(74) *Attorney, Agent, or Firm* — Jordan IP Law, LLC; Tina Yin Sowatzke, Esq.

(57) ABSTRACT

Methods are described that impart a dual texture to baked goods. The methods generally include making a leavened batter that contains a relatively low flour to water ratio, followed by combining the leavened batter with a second portion of flour to make a dough.

20 Claims, No Drawings

DUAL TEXTURED FOOD

CROSS REFERENCE TO RELATED APPLICATIONS

This application represents a continuation application of U.S. patent application Ser. No. 16/561,367 filed Sep. 5, 2019, now U.S. Pat. No. 11,889,839, which claims the benefit of U.S. Provisional Patent Application No. 62/728, 333 filed Sep. 7, 2018, entitled "DUAL TEXTURED FOOD". The entire content of these applications are incorporated herein by reference.

BACKGROUND OF THE INVENTION

Baked goods are often considered "comfort foods," which consumers enjoy eating as part of family or cultural tradition. Homemade baked goods can often deliver an eating experience that is more difficult to achieve consistently in a commercial setting. Reasons for this may include the nature of small-batch production versus large-batch production, as well as the rituals and ingredients that home cooks may use that are not practical or available in a commercial setting. Still, because baked goods provide an enjoyable eating experience to many consumers, particularly when the baked goods resemble homemade, there is a need to provide baked good eating experiences in a commercial setting that better resembles homemade.

SUMMARY

A method of making a dough is provided herein. The method includes providing a leavened batter comprising a first portion of flour and having a first flour to water ratio of from about 1.2:1 to about 1:3.5 by weight, and combining the leavened batter with a second portion of flour to produce the dough, the dough having a second flour to water ratio of from about 1.7:1 to about 1.3:1 by weight. In some embodiments, the first flour to water ratio can be from 1:1 to 1:2.

In some embodiments of a method of making a dough provided herein, the method can further include providing a mixture of flour, fat, and a leavening agent, and combining the mixture with water to produce the leavened batter. In some embodiments, the mixture and water can be combined by mixing for about 2 minutes to about 4 minutes.

In some embodiments of a method of making a dough provided herein, the leavened batter and the second portion of flour can be combined by mixing for about 20 seconds to about 1 minute.

In some embodiments of a method of making a dough provided herein, the first portion of flour can include flour having a protein content of less than 10%, or a protein content of about 7% to about 8%.

In some embodiments of a method of making a dough provided herein, the second portion of flour can include a flour having a protein content of less than 10%, or a protein content of about 7% to about 8%.

In some embodiments of a method of making a dough provided herein, the dough can include a heat activated leavening agent.

In some embodiments of a method of making a dough provided herein, the dough can include a fat in an amount of up to 30%, a sugar in an amount of up to 20%, and a leavener in an amount of 1-5%.

In some embodiments, a method of making a dough provided herein can further include forming the dough into pieces. In some embodiments, a method of making a dough provided herein can further include packaging the dough. In some embodiments, a method of making a dough provided herein can further include refrigerating or freezing the dough.

A method of making a freezer-to-oven dough is provided herein. The method includes providing a leavened batter comprising a first portion of flour and having a first flour to water ratio of from about 1.2:1 to about 1:3.5 by weight, combining the leavened batter with a second portion of flour to produce the dough, the dough having a second flour to water ratio of from about 1.7:1 to about 1.3:1 by weight, forming the dough into portions, and freezing the portions to produce the freezer-to-oven dough. In some embodiments, the first flour to water ratio can be from 1:1 to 1:2.

In some embodiments of a method of making a dough provided herein, the method can further include providing a mixture of flour, fat, and a leavening agent, and combining the mixture with water to produce the leavened batter. In some embodiments, the mixture and water can be combined by mixing for about 2 minutes to about 4 minutes.

In some embodiments of a method of making a dough provided herein, the leavened batter and the second portion of flour can be combined by mixing for about 20 seconds to about 1 minute.

In some embodiments of a method of making a freezer-to-oven dough provided herein, the first portion of flour can include flour having a protein content of less than 10%, or a protein content of about 7% to about 8%.

In some embodiments of a method of making a freezer-to-oven dough provided herein, the second portion of flour can include a flour having a protein content of less than 10%, or a protein content of about 7% to about 8%.

In some embodiments of a method of making a freezer-to-oven dough provided herein, the freezer-to-oven dough can include a heat activated leavening agent.

In some embodiments of a method of making a freezer-to-oven dough provided herein, the freezer-to-oven dough can include a fat in an amount of up to 30%, a sugar in an amount of up to 20%, and a leavener in an amount of 1-5%.

Also provided herein are methods of making a baked good. The method includes baking a dough that was made using a method of making a dough or a method of making a freezer-to-oven dough provided herein. In some embodiments, the baked good can be a biscuit, a donut, a scone, a donut hole, or a corn bread.

Also provided herein are baked goods made using a method of making a baked good provided herein.

Additional objects, features and advantages of the invention will become more readily apparent from the following detailed description.

DETAILED DESCRIPTION

It was discovered, and is described herein, that a process of making a dough that includes first making a leavened batter, then adding flour to the leavened batter to make the dough, can produce a baked good (e.g., a biscuit or a donut) that has a soft inner structure and a crisp surface. This dual texture achieves an eating experience that consumers prefer over other textures. It was particularly surprising that this phenomenon could be applied generally to many formulations suitable for making a dual textured baked good, including biscuits. Without being bound to theory, it is believed that the flour included when making the batter is hydrated to a greater degree than the flour added for producing the dough, and that having different levels of hydration in the flour lends to the dual texture of a baked good made from the dough.

The invention relates generally to methods of preparing doughs suitable for baked goods, and to doughs and baked goods made using the described methods. The embodiments of the invention described herein are not intended to be exhaustive or to limit the invention to the precise forms disclosed in the following detailed description. Rather, the embodiments are chosen and described so that others skilled in the art can appreciate and understand the principles and practices of the invention.

As used herein, the term "baked goods" can include any dough-based food, such as a biscuit, a donut, a scone, a corn bread, a donut hole, or the like that is traditionally baked or fried. A baked good produced from a dough made by a method provided herein has a dual texture, with a soft inner texture and a crisp surface, when baked.

Methods

Provided herein are methods for making a dough that include making a leavened batter. A leavened batter includes water, a leavening agent, and a first portion of flour. Flour and water are included in a leavened batter to provide a flour to water ratio of from about 1.2:1 to about 1:3.5 (e.g., about 1.1:1 to about 1:2.5, or about 1:1 to about 1:2). As used herein, the term "flour to water ratio" refers to the ratio of flour to water based on weight. For example, a dough or batter having flour to water ratio of 1:1 indicates that the batter or dough contains about 1 gram of flour per 1 gram of water, whereas a flour to water ratio of 1:1.5 indicates that the dough or batter contains about 1 grams of flour for every 1.5 grams of water.

Flour suitable for use as a first portion of flour include any edible flour, such as wheat flour (e.g., hard wheat flour, soft wheat flour, cake flour, pastry flour, and the like), other grain flours (e.g., oat, barley, rice, or the like), seed flours (e.g., *quinoa*, buckwheat, and the like), nut flours (e.g., almond, cashew, and the like), root flours (e.g., tapioca, potato, and the like), legume flours (e.g., peanut, soy, and the like), or any combination thereof. Although a method provided herein appears to provide some level of desired dual-textured baked good, wheat flours with a protein content of less than 10% (e.g., from about 5% to about 9%, or from about 7% to about 8%), such as cake flour or pastry flour can contribute to a particularly distinguishable texture, with a soft inner texture and crisp surface on a baked good. Similarly, unbleached flour can contribute to a texture with a distinct soft inner texture and crisp surface.

Water in a leavened batter can be provided by any appropriate source, including liquid water, ice, milk, or the like. Water included in a leavened batter should be sufficient to hydrate the first portion of flour and activate at least a portion of the leavening agent included in the leavened batter.

A leavening agent can be included in a leavened batter in an amount of about 1% to about 5% (e.g., from about 2% to about 3%). As used herein, "leavening agent" refers to one or more composition that reacts to form air bubbles in a batter or dough. Leavening agents can include, for example, acid/base combinations and/or compounds that react in the presence heat (e.g., ammonium bicarbonate or ammonium carbonate) that are generally used for leavening in batters or doughs. Suitable leavening acids include for example, sodium acid pyrophosphate (SAPP), sodium aluminum phosphate (SALP), monocalcium phosphate (MCP), sodium aluminum sulfate (SAS), potassium bitartrate (cream of tartar), and the like, or combinations thereof. Suitable leavening bases include, for example, sodium bicarbonate, ammonium bicarbonate, potassium bicarbonate, and the like, or combinations thereof. In some embodiments, a leavening agent can include an amount of a leavening acid that is molarly balanced with a leavening base, such that reactions leave little or no remaining leavening acid or leavening base. In some embodiments, a leavening agent can include more of either a leavening acid or leavening base. For example, a leavening agent can include excess leavening base to increase browning in a baked good. In some embodiments, a leavening agent can be fast-acting (i.e., include one or more compositions that react to produce a gas at temperatures below baking temperature). In some embodiments, a leavening agent can be slow-acting (i.e., include one or more compositions that react to produce gas at a baking temperature). In some embodiments, a leavening agent can be double-acting (i.e., include one or more compositions that react at a temperature below baking temperature and one or more compositions that react at a baking temperature).

In some embodiments, a leavened batter can include a fat in an amount of up to 30% (e.g., from about 10% to about 25%, or from about 10% to about 18%). Any edible fat can be used, such as solid fat (e.g., shortening, shortening chips, butter, lard, or the like), an oil (e.g., soybean oil, peanut oil, sunflower oil, or the like), or any combination thereof. Including a fat in a leavened batter can be a matter of convenience, or to ensure thorough incorporation into the dough. However, in some embodiments, all or a portion of a fat can be incorporated into the dough rather than the batter.

In some embodiments, a sugar can be included in a batter in an amount of up to 20% (e.g., from about 1% to about 10%, or about 1% to about 5%). Suitable sugars can include table sugar, dextrose, honey, maple syrup, and the like, or any combination thereof. In some embodiments, In some embodiments, additional ingredients can be included in a batter, such as flavorants (e.g., salt, natural flavors, artificial flavors, or the like), dough conditioners (e.g., ascorbic acid, DATEM, enzymes, lecithin, or the like), dairy ingredients (e.g., buttermilk, milk, buttermilk powder, whey protein, skim milk powder, or the like), inclusions (e.g., seeds, confections, chocolate, nuts, or the like), colorants (e.g., natural or artificial colorants), or the like. However, additional ingredients may also be added to a dough or with a second portion of flour to the leavened batter, as desired. For example, inclusions may be better suited to being added to a dough to ensure that the inclusions remain suspended.

A leavened batter can be made in any suitable equipment, such as a horizontal or vertical mixer. In some embodiments, dry ingredients can be combined prior to adding water to produce a leavened batter. The first portion of flour and the water in a leavened batter should be mixed for sufficient time to achieve a uniform batter. For example, the first portion of flour and the water can be mixed for at least 2 minutes (e.g., from about 2 minutes to about 4 minutes) to achieve a uniform batter. A leavening agent can be included during all or part of mixing the first portion of flour and water, such that at least a portion of the leavening agent reacts to leaven the batter.

In some embodiments, a leavened batter has a flow of less than 22 cm at 15 seconds as measured using a Bostwick consistometer at a batter temperature of 50° F. (10° C.). As flow at 15 seconds increases (i.e., consistency decreases) in a batter produced using a method provided herein, the baked specific volume of a baked good made from a dough using the method tends to decrease. Without being bound to theory, it is believed that a higher batter consistency improves retention of bubbles created by a leavening agent in the batter, and ultimately a dough made using a method provided herein, thus increasing bake specific volume of a baked good.

A leavened batter provided herein is combined with a second portion of flour to produce a dough. Flour and water are included in a dough to provide a flour to water ratio of from about 1.7:1 to about 1.3:1 (e.g., about 1.6:1 to about 1.4:1, or about 1.5:1). A second portion of flour can be the same or different than the first portion of flour included in the leavened batter. As with a first portion of flour, a second portion of flour can achieve additional textural benefits if all or a portion of the second portion of flour has a protein content of less than 10% (e.g., about 5% to about 9%, or about 7% to about 8%), and/or all or part of the second portion of flour is unbleached. In some embodiments, the second portion of flour added to a leavened batter can have about the same mass as the first portion of flour used to make the leavened batter.

A second portion of flour and a leavened batter can be combined using any suitable equipment, including the same or different equipment used to make a leavened batter. Generally, a second portion of flour and a leavened batter are combined such that the second portion of flour is uniformly incorporated to make a dough. Generally, it is preferred that the amount of mixing is such that the second portion of flour remains less hydrated than the first portion of flour. For example, a second portion of flour can be mixed with a leavened batter for a minute or less (e.g., from about 20 seconds to about 1 minute, or from about 20 seconds to about 40 seconds).

A dough produced using a method provided herein can include ingredients appropriate for a baked good. For example, a dough can include fat in an amount of up to 30% (e.g., up to about 17%, or from about 10% to about 17%), sugar in an amount of up to 20% (e.g., up to about 10%, or up to about 5%), a leavener in an amount of 1-5%, and/or other ingredients in an amount of up to about 46%. As mentioned above, the described methods can be flexibly used on many formulations used to make baked goods to impart a dual texture to the baked goods.

A dough produced using a method provided herein can be formed into portions using any suitable means. For example, a dough produced using a method provided herein can be rolled and cut into squares or circles to make biscuits, or rolled into balls or cut into rings to make donut holes or donuts. A formed dough can be baked immediately, or the formed dough can be chilled to refrigerator or freezer temperature and packaged for later use. In some embodiments, a dough produced using a method provided herein can be formed into biscuit shapes and frozen, then baked directly from frozen. Surprisingly, dough made using a method provided herein can be used to bake biscuits having a soft, crumbly inner texture and a crisp top, regardless of whether the dough is baked fresh, or if it was baked directly from frozen (i.e., "freezer-to-oven"). A dough made using a method provided herein can be used to make baked donuts or donut holes with a texture similar to a fried donut or donut hole.

EXAMPLES

Example 1—Biscuit Dough Production

Various biscuit dough formulations were tested to determine the effects of creating a batter with a portion of the flour, followed by a dough by combining the batter with the remainder of the flour. Biscuit dough formulations were identical to formulations that were used for biscuits for a standard method, which included combining all of the dry ingredients and then mixing with water to produce a dough. A range of ingredients shown in Table 1 was used to make doughs.

TABLE 1

| First portion of flour (% by weight) | Second portion of flour (% by weight) | Water (% by weight) | Fat (% by weight) | Other ingredients, including leavening agent (% by weight) |
|---|---|---|---|---|
| 10-35 | 14-40 | 20-32 | Up to 30 | Up to 46 |

Each formulation was made by combining the first portion of flour with a leavening agent, any fat, and any other ingredients to make a dry mix, mixing the dry mix with the water for sufficient time to achieve a leavened batter that is uniformly mixed, typically about 2-3 minutes. Generally, the leavened batter was sufficiently thick to retain bubbles from the leavening agent. The second portion of flour was added to the leavened batter and mixed briefly to produce a dough. Dough could be readily formed into any desired shape. For the sake of testing, doughs were rolled to about 9 mm and cut into circular biscuits, and either baked fresh or frozen then baked as a freezer-to-oven product.

Generally, all of the formulations produced, without any special handling or treatment, a biscuit that displayed a soft interior and a crisp surface. Notably, the surfaces of all of the formulations were crispier than the same formulations made using the standard procedure for making a dough. It was noted that using a flour with a low protein content, such as a pastry or cake flour, and/or using an unbleached flour could accentuate the contrast between the soft inner part of the biscuit and the crisp top. It was also noted that using a slight excess of leavening base or a buttermilk in the formulation could increase browning on the surface.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A method of making a dough, the method comprising:
   a. providing a leavened batter comprising water, a leavening agent comprising an acid/base combination, and a first portion of flour, wherein the leavened batter has a first flour to water ratio of from about 1.1:1 to about 1:2.5 by weight, the first portion of flour including unbleached flour and a protein content less than 10%, at least a portion of the leavening agent is reacted to leaven the batter, and the leavened batter has a flow of less than 22 cm at 15 seconds as measured using a Bostwick consistometer at a temperature of 50° F. (10° C.); and
   b. combining the leavened batter with a second portion of flour to produce the dough, wherein the second portion of flour includes unbleached flour and has a protein content less than 10%.

2. The method of claim 1, wherein the first flour to water ratio is from about 1:1 to about 1:2.

3. The method of claim 1, wherein the first portion of flour or the second portion of flour consists of the unbleached flour.

4. The method of claim 1, wherein the protein content of the first portion of flour or the second portion of flour is about 5% to about 9%.

5. The method of claim 1, wherein the leavening agent comprises sodium acid pyrophosphate.

6. The method of claim 1, wherein the leavening agent includes one or more compositions that react at a temperature below a baking temperature and one or more compositions that react at the baking temperature.

7. The method of claim 1, further comprising providing a mixture of the first portion of flour, a fat, and the leavening agent, and combining the mixture with the water to produce the leavened batter.

8. The method of claim 7, wherein the leavened batter includes the fat in an amount of up to 30% and sugar in an amount of up to 20%.

9. The method of claim 1, further comprising forming the dough into portions and refrigerating or freezing the portions.

10. A method of making a freezer-to-oven dough, comprising:
   a. providing a leavened batter comprising water, a leavening agent comprising an acid/base combination, and a first portion of flour, wherein the leavened batter has a first flour to water ratio of from about 1.1:1 to about 1:2.5 by weight, the first portion of flour including unbleached flour and a protein content less than 10%, at least a portion of the leavening agent is reacted to leaven the batter, and the leavened batter has a flow of less than 22 cm at 15 seconds as measured using a Bostwick consistometer at a temperature of 50° F. (10° C.);
   b. combining the leavened batter with a second portion of flour to produce a dough, wherein the second portion of flour comprises unbleached flour and has a protein content less than 10%;
   c. forming the dough into portions; and
   d. freezing the portions to produce the freezer-to-oven dough.

11. The method of claim 10, wherein the first flour to water ratio is from about 1:1 to about 1:2.

12. The method of claim 10, wherein the first portion of flour or the second portion of flour consists of the unbleached flour.

13. The method of claim 10, wherein the protein content of the first portion of flour or the second portion of flour is about 5% to about 9%.

14. The method of claim 10, wherein the leavening agent comprises sodium acid pyrophosphate.

15. The method of claim 10, wherein the leavening agent includes one or more compositions that react at a temperature below a baking temperature and one or more compositions that react at the baking temperature.

16. A method of making a baked good, the method comprising baking the freezer-to-oven dough of claim 10 to produce the baked good.

17. The method of claim 1, wherein the dough is configured to be formed into portions by rolling and cutting.

18. The method of claim 1, wherein the leavened batter includes the leavening agent in an amount of 1% to about 5%.

19. The method of claim 1, further comprising forming the dough into portions having desired shapes, the portions being configured to hold their desired shapes.

20. A method of making a dough, the method comprising:
   a. providing a leavened batter comprising water, a leavening agent comprising an acid/base combination, and a first portion of flour, wherein the leavened batter has a first flour to water ratio of from about 1.1:1 to about 1:2.5 by weight, the first portion of flour including unbleached flour and a protein content less than 10%, at least a portion of the leavening agent is reacted to leaven the batter, and the leavened batter has a flow of less than 22 cm at 15 seconds as measured using a Bostwick consistometer at a temperature of 50° F. (10° C.); and
   b. combining the leavened batter with a second portion of flour to produce the dough, wherein the second portion of flour includes unbleached flour and has a protein content less than 10%, wherein the dough is configured to be formed into portions by rolling or cutting.

* * * * *